(12) United States Patent
Asakura et al.

(10) Patent No.: US 9,244,265 B2
(45) Date of Patent: Jan. 26, 2016

(54) VIEWING OPTICAL SYSTEM AND IMAGING APPARATUS USING THE SAME

(75) Inventors: Ayako Asakura, Hino (JP); Hisashi Goto, Suginami-ku (JP)

(73) Assignee: OLYMPUS CORPORATION, Tokyo (JP)

( * ) Notice: Subject to any disclaimer, the term of this patent is extended or adjusted under 35 U.S.C. 154(b) by 419 days.

(21) Appl. No.: 12/454,683

(22) Filed: May 20, 2009

(65) Prior Publication Data

US 2009/0290226 A1    Nov. 26, 2009

(30) Foreign Application Priority Data

May 21, 2008    (JP) ................................ 2008-132723

(51) Int. Cl.
*G02B 25/00*    (2006.01)
*G02B 23/00*    (2006.01)

(52) U.S. Cl.
CPC .................................. *G02B 23/145* (2013.01)

(58) Field of Classification Search
CPC .............................. G02B 25/001; G02B 23/14

USPC .......................................................... 359/646
See application file for complete search history.

(56) References Cited

U.S. PATENT DOCUMENTS

| | | | |
|---|---|---|---|
| 6,618,209 B2* | 9/2003 | Nishioka et al. | 359/676 |
| 6,958,863 B2* | 10/2005 | Miyauchi et al. | 359/646 |
| 7,125,120 B2* | 10/2006 | Aruga | 353/20 |
| 2002/0012052 A1* | 1/2002 | Nagano | 348/228 |
| 2002/0149860 A1* | 10/2002 | Miyauchi et al. | 359/728 |
| 2004/0021776 A1* | 2/2004 | Tochigi et al. | 348/207.99 |
| 2005/0243412 A1* | 11/2005 | Bellouard et al. | 359/368 |
| 2005/0264674 A1* | 12/2005 | Miyauchi et al. | 348/335 |
| 2006/0274182 A1* | 12/2006 | Miyauchi et al. | 348/333.01 |

FOREIGN PATENT DOCUMENTS

| | | |
|---|---|---|
| JP | 2000-056257 | 2/2000 |
| JP | 2001-356295 | 12/2001 |

* cited by examiner

Primary Examiner — James Greece
(74) Attorney, Agent, or Firm — Kenyon & Kenyon LLP

(57) ABSTRACT

The invention provides a viewing optical system positioned between a viewing plane as a virtual plane and an eye point. The viewing optical system comprises, in order from the viewing plane side, a first lens and a filter.

12 Claims, 8 Drawing Sheets

Example 1

Example 1

Example 2

Example 1

Example 2

Example 3

VIEWING OPTICAL SYSTEM AND IMAGING APPARATUS USING THE SAME

This application claims benefit of Japanese Application No. 2008-132723 filed in Japan on May 21, 2008, the contents of which are incorporated by this reference.

BACKGROUND OF THE INVENTION

The invention relates to a viewing optical system, and an imaging apparatus using the same.

Patent Publication 1 discloses a viewfinder that comprises a polarizing device located in front of a display device for the purpose of size reductions and high quality, and Patent Publication 2 discloses a viewfinder in which a virtual image position is spaced away from a polarizing device at a distance greater than depth of field.

Patent Publication 1: JP(A) 2001-356295
Patent Publication 2: JP(A) 2000-56257

SUMMARY OF THE INVENTION

The present invention provides a viewing optical system positioned between a viewing plane as a virtual surface and an eye point, characterized by comprising, in order from said viewing plane side, a first lens and a filter.

The present invention also provides an imaging apparatus characterized by comprising an imaging device, an image display device adapted to display an image, a controller adapted to convert image information obtained from said imaging device into signals displayable on said image display device, and a viewfinder adapted to guide an image displayed on said image display device to a viewer's eye, wherein the above viewing optical system is used for said viewfinder.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 9:
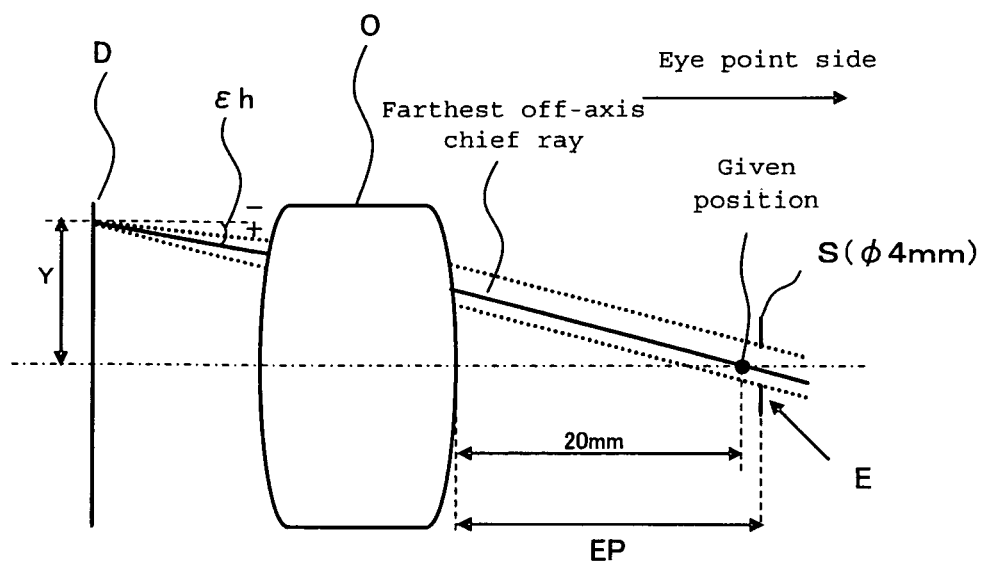
FIG. 9 is illustrative of a viewing plane, an eye point, an eye point distance, etc.

Some embodiments of the invention are now explained. In what follows, it should be noted that an eye point E refers to a position (the position of a virtual stop S) where the farthest off-axis light beam leaving a viewing plane D passes full through the virtual stop S of $\phi 4$. At this position, the diameter of the farthest off-axis light beam is substantially in coincidence with the diameter ($\phi 4$) of an aperture in the virtual stop S. It should also be noted that an eye point distance EP refers to a distance from the lens surface located in the viewing optical system (eyepiece lens) and nearest to an eye point side to the eye point (see FIG. 9).

The viewing optical system here is suitable for use on a viewfinder. In the viewfinder, specific objects such as a field stop, ground glass or an image display device are located on a position of the viewing plane D. However, the viewing optical system itself has none of the specific objects at the position of the viewing plane D. In the viewing optical system, therefore, the viewing plane D becomes a virtual surface.

The viewing optical system here is interposed between the viewing plane as a virtual surface and the eye point. This viewing optical system comprises, in order from the viewing plane side, a first lens and a filter.

The filter is positioned on an eye point side with respect to the first lens; so diopter (focus) is less likely to focus on the filter. In this case, even when there are dirt and dust deposited on the filter, the user would remain oblivious to that. For this reason, it is possible to achieve an easy-to-view viewing optical system. There is also no need of taking a distance between the viewing plane and the filter, which makes the optical system compact. That is, it is possible to achieve a generally compact viewing optical system.

For the viewing optical system here, it is preferable to comprise a front group having a first lens and a rear group located between the filter and the eye point.

As the filter is interposed between the front group and the rear group, the user would remain oblivious to dirt, dust or the like deposited to the filter.

For the viewing optical system here, it is preferable that chief rays incident onto the filter are substantially parallel with an optical axis.

Chief rays are incident onto the filter at so equal an angle that uniform action is achievable irrespective of the angle of field. That is, from the center to the periphery of the field of view, the filter can have uniform action. Thus, the viewing optical system includes a portion where the chief rays are substantially parallel with the optical axis, and the filter should preferably be located on that portion.

Preferably in the viewing optical system here, the rear group should at least comprise a lens group having positive refracting power.

Thus, the filter can have more uniform action. Note here that the lens group may be made up of one lens or a plurality of lenses.

For the viewing optical system here, it is preferable to satisfy the following condition (1):

$$0 < f/fp < 1.0 \tag{1}$$

where f is the focal length of the whole viewing optical system, and fp is the focal length of the lens group having positive refracting power.

Being short of the lower limit of 0 to Condition (1) is not preferable, because light beams turn too much inward (toward the optical axis side) as they travel toward the periphery. Exceeding the upper limit of 1.0 to Condition (1) is again not preferable, because light beams turn too much outward as they travel toward the periphery.

For the viewing optical system here, it is preferable to satisfy the following condition (2):

$$0 < d/Y < 1 \quad (2)$$

where d is the distance between the viewing plane and the first lens, and

Y is a position on the viewing plane where the farthest off-axis ray passes.

Exceeding the upper limit of Condition (2) is not preferable because the optical system grows bulky.

For the viewing optical system here, it is preferable to satisfy the following condition (3):

$$0.01 < \tan\theta/d < 0.5 \quad (3)$$

where d is the distance between the viewing plane and the first lens, and

θ is the maximum angle of field.

Being short of the lower limit of 0.01 to Condition (3) is not preferable, because the optical system and the filter grow large in the total length and outer diameter.

Exceeding the upper limit of 0.5 to Condition (3) causes the lens to draw near the viewing plane. This is not preferable because diopter is likely to focus on dirt or defects on the lens surface.

Preferably in the viewing optical system here, the rear group should comprise at least one moving lens.

The filter is sandwiched between the moving lens group and the viewing plane; so entrance of dirt or dust onto the viewing plane is reduced or eliminated. Note that when the rear group is made up of one lens, that one lens may be designed to be movable. When the rear lens is made up of a plurality of lenses, one or some of them may be designed to be movable. In association with movement of the plurality of lenses, the rear group may be designed to be movable as a whole.

In the viewing optical system here, it is preferable that the filter is composed of a polarizing plate.

It is possible to reduce ghosts.

In the viewing optical system here, it is preferable that there is a field stop or image display device located at the position of the viewing plane with the satisfaction of the following condition (4):

$$30 < \tan^{-1}(Y2/f) < 47 \quad (4)$$

where Y2 is the diagonal length of the field stop or image display device, and f is the focal length of the whole viewing optical system.

As the lower limit of 30 to Condition (4) is not reached, there is the field of view narrowing: this is not preferable because resolution does not grow high from constraints on the eye's resolving power. In addition, the total length of the viewing optical system becomes too short: this is not preferable because difficulty is experienced in stowing the filter in the optical system.

As the upper limit of 47 to Condition (4) is exceeded, the focal length of the whole viewing optical system relative to the viewing plane becomes short: this is not preferable because it is difficult to correct astigmatism produced upon insertion of the filter.

With the embodiments here, it is possible to obtain a viewing optical system that is compact and easy to view and enables a filter to have uniform action, and an imaging apparatus using the same, as described above.

Some examples of the invention are now explained with reference to the drawings. Note here that each example is directed to the application of the viewing optical system to a viewfinder. In what follows, therefore, the viewing optical system will be explained with reference to the viewfinder.

Figure 1:
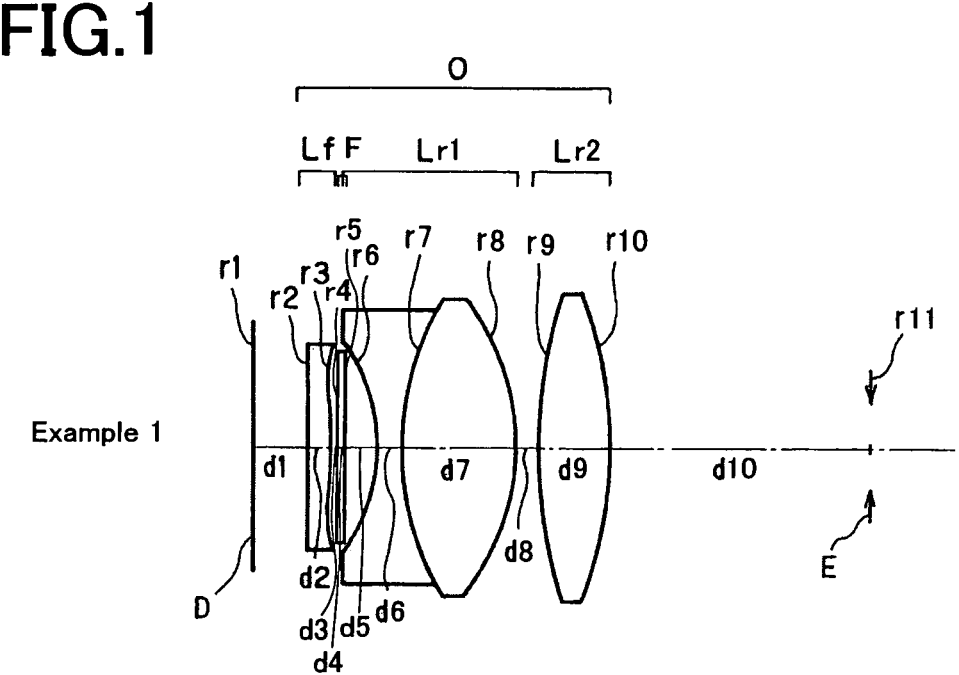
FIG. 1 is illustrative of Example 1 of the inventive viewfinder.

FIG. 1 is illustrative in section along the optical axis of the optical arrangement of the first example of the viewfinder.

The viewfinder according to the first example has a viewing optical system O located between a viewing plane D where an object image is to be formed and an eye point E.

The viewing optical system O is made up of, in order from a viewing plane D side, a front lens component Lf as the front group, a filter F, a first rear lens component Lr1 as the first rear group, and a second rear lens component Lr2 as the second rear group. The front lens component Lf here is composed of a plano-convex positive lens that is planar on the viewing plane D side. The first rear lens component Lr1 is composed of a cemented lens of a double-concave negative lens and a double-convex positive lens. The second rear lens component Lr2 is composed of a double-convex positive lens.

An aspheric surface is used on the eye point side of the front lens component Lf.

Figure 2:
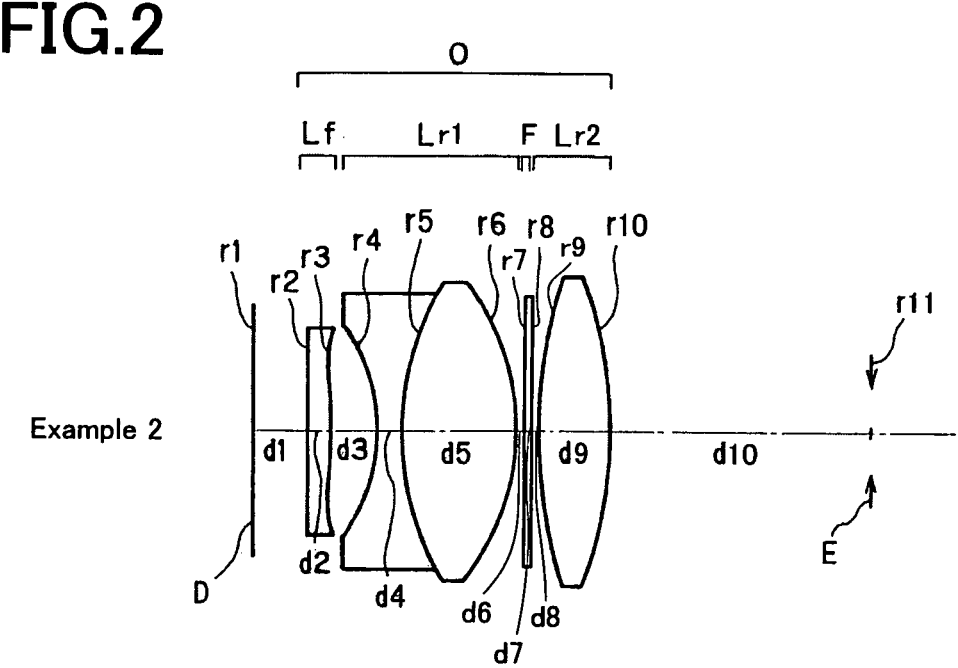
FIG. 2 is illustrative of Example 2 of the inventive viewfinder.

FIG. 2 is illustrative in section along the optical axis of the optical arrangement of the second example of the viewfinder.

The viewfinder according to the second example has a viewing optical system O located between a viewing plane D where an object image is to be formed and an eye point E.

The viewing optical system O is made up of, in order from a viewing plane D side, a first front lens component Lf1 as the first front group, a second front lens component Lf2 as the second front group, a filter F, and a rear lens component Lr as the rear group. The first front lens component Lf1 here is composed of a plano-convex positive lens that is planar on the viewing plane D side. The second front lens component Lf2 is composed of a cemented lens of a double-concave negative lens and a double-convex positive lens. The rear lens component Lr is composed of a double-convex positive lens.

An aspheric surface is used on the eye point side of the first front lens component Lf.

Figure 3:
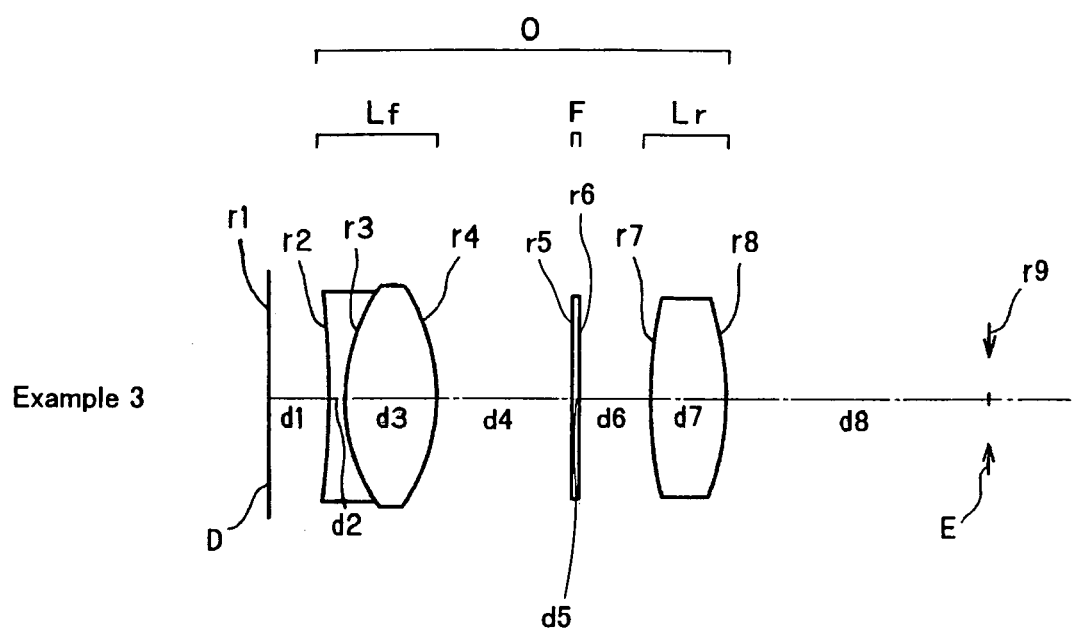
FIG. 3 is illustrative of Example 3 of the inventive viewfinder.

FIG. 3 is illustrative in section along the optical axis of the optical arrangement of the third example of the viewfinder.

The viewfinder according to the third example has a viewing optical system O located between a viewing plane D where an object image is to be formed and an eye point E.

The viewing optical system O is made up of, in order from a viewing plane D side, a front lens component Lf as the front group, a filter, and a rear lens component Lr as the rear group. The front lens component Lf is composed of a cemented lens of a double-concave negative lens and a double-convex positive lens, and the rear lens component Lr is composed of a double-convex positive lens.

To enable diopter to be corrected, the viewing optical system O may be designed such that the whole or a part of it is movable. When a part of the optical system is designed to be movable, the immovable or fixed portion has a dustproof effect on the viewing plane D. There may further be a cover glass provided on the eye point side. Note here that when a display device such as a liquid crystal display device LCD or an organic EL is used on the viewing plane D, the above viewfinder may be used as an electronic viewfinder.

Numerical data on Examples 1, 2 and 3 will be set out below together with the values of Conditions (1), (2), (3) and (4).

Referring to the numerical data on and the values of Examples 1, 2 and 3, r is the radius of curvature of each lens surface, d is the surface-to-surface space of each lens, n is the refractive index of each lens, and ν is the Abbe constant of each lens. Note here that aspheric configuration is given by the following formula where x is an optical axis provided that the direction of travel of light is positive and y is a direction orthogonal to the optical axis.

$$x=(y^2/r)/[1+\{1-(K+1)(y/r)^2\}^{1/2}]+A2y^2+A4y^4+A6y^6+A8y^8+A10y^{10}$$

where r is a paraxial radius of curvature, K is a conic coefficient, and A2, A4, A6, A8 and A10 are the second-, fourth-, sixth-, eighth- and tenth-order aspheric coefficients, respectively.

In the numerical data, E±N (N is an integer) indicates $\times 10^{\pm N}$.

Numerical Example 1 in mm

| Surface Data | | | | | |
|---|---|---|---|---|---|
| Surface No. | R | d | n | vd | Effective Diameter |
| 1 (Viewing Plane) | ∞ | variable | | | 17.75 |
| 2 | ∞ | 2.00 | 1.52542 | 55.78 | 17.24 |
| 3 (Aspheric) | 17.872 | 0.54 | | | 17.07 |
| 4 | ∞ | 0.50 | 1.51633 | 64.14 | 17.60 |
| 5 | ∞ | 3.00 | | | 17.60 |
| 6 | −17.090 | 2.14 | 1.80518 | 25.42 | 17.25 |
| 7 | 26.464 | 10.12 | 1.83481 | 42.71 | 20.94 |
| 8 | −22.094 | 2.00 | | | 23.38 |
| 9 | 46.257 | 6.24 | 1.64000 | 60.08 | 26.80 |
| 10 | −40.996 | variable | | | 22.49 |
| 11 (Pupil Position) | ∞ | | | | |

Aspheric Coefficient
3$^{rd}$ Surface
K=0, A2=−4.26E-02, A4=1.63E-04

| Amount of Change | | | |
|---|---|---|---|
| Diopter (m$^{-1}$) | +1 | −1 | −3 |
| d1 | 5.88 | 4.88 | 3.88 |
| d10 | 22.00 | 23.00 | 24.00 |

| Various Data | | | |
|---|---|---|---|
| Diopter (m$^{-1}$) | +1 | −1 | −3 |
| Angle of Field | 43.55° | 44.19° | 44.70° |
| Total Length | 32.43 | 31.43 | 30.43 |
| Entrance Pupil Position | 10224.98 | −513.41 | −251.68 |

Focal Length: 22.1
Front Principal Point Position: 16.72
Front Principal Point Position: −0.39
Object Height: 8.88
Focal Length of the Lenses
Front Lens component: 65.23
First Rear Lens Component: 282.45
First Rear Lens Component Negative Lens: −12.62
First Rear Lens Component Positive Lens: 15.93
Second Rear Lens Component: 34.93

Numerical Example 2 in mm

| Surface Data | | | | | |
|---|---|---|---|---|---|
| Surface No. | r | d | n | vd | Effective Diameter |
| 1 (Viewing Plane) | ∞ | variable | | | 17.75 |
| 2 | ∞ | 2.00 | 1.52542 | 55.78 | 17.24 |
| 3 (Aspheric) | 17.872 | 4.04 | | | 17.07 |
| 4 | −17.090 | 2.14 | 1.80518 | 25.42 | 17.25 |
| 5 | 26.464 | 10.12 | 1.83481 | 42.71 | 20.94 |
| 6 | −22.094 | 0.75 | | | 23.38 |
| 7 | ∞ | 0.50 | 1.51633 | 64.14 | 22.46 |
| 8 | ∞ | 0.75 | | | 22.46 |
| 9 | 46.257 | 6.24 | 1.64000 | 60.08 | 26.80 |
| 10 | −40.996 | variable | | | 22.49 |
| 11 (Pupil Position) | ∞ | | | | |

Aspheric Coefficient
3$^{rd}$ Surface
K=0, A2=−4.26E-02, A4=1.63E-04

| Amount of Change | | | |
|---|---|---|---|
| Diopter (m$^{-1}$) | +1 | −1 | −3 |
| d1 | 5.88 | 4.88 | 3.88 |
| d10 | 22.00 | 23.00 | 24.00 |

| Various Data | | | |
|---|---|---|---|
| Diopter (m$^{-1}$) | +1 | −1 | −3 |
| Angle of Field | 43.55° | 44.19° | 44.70° |
| Total Length | 32.43 | 31.43 | 30.43 |
| Entrance Pupil Position | 10224.98 | −513.41 | −251.68 |

Focal Length: 22.1
Front Principal Point Position: 16.72
Front Principal Point Position: −0.39
Object Height: 8.88
Focal Length of the Lenses
First Front Lens component: 65.23
Second Front Lens Component: 282.45
Second Front Lens Component Negative Lens: −12.62
Second Front Lens Component Positive Lens: 15.93
Rear Lens Component: 34.93

Numerical Example 3 in mm

| Surface Data | | | | | |
|---|---|---|---|---|---|
| Surface No. | r | D | nd | vd | Effective Diameter |
| 1 (Viewing Plane) | ∞ | variable | | | 17.74 |
| 2 | −89.444 | 1.50 | 1.80518 | 25.42 | 17.72 |
| 3 | 18.127 | 7.97 | 1.51633 | 64.14 | 18.09 |
| 4 | −18.300 | 13.07 | | | 19.06 |

-continued

Surface Data

| Surface No. | r | D | nd | vd | Effective Diameter |
|---|---|---|---|---|---|
| 5 | ∞ | 0.50 | 1.52000 | 16.14 | 18.63 |
| 6 | ∞ | 6.00 | | | 18.61 |
| 7 | 50.973 | 6.64 | 1.48749 | 70.23 | 16.89 |
| 8 | −28.519 | variable | | | 16.05 |
| 9 (Virtual Stop) | ∞ | | | | |

Amount of Change

| Diopter ($m^{-1}$) | +1 | −1 | −3 |
|---|---|---|---|
| d1 | 7.12 | 5.22 | 3.42 |
| d8 | 21.10 | 23.00 | 24.80 |

Various Data

| Diopter ($m^{-1}$) | +1 | −1 | −3 |
|---|---|---|---|
| Angle of Field | 32.64° | 32.90° | 32.98° |
| Total Length | 42.30 | 40.40 | 38.60 |
| Entrance Pupil Position | 183.06 | 272.67 | 513.20 |

Focal Length: 30.7
Front Principal Point Position: 24.53
Rear Principal Point Position: −2.16
Object Height: 8.88
Focal Length of the Lenses
Front Lens component: 141.18
Front Lens Component Negative Lens: −18.60
Front Lens Component Positive Lens: 19.06
Rear Lens Component: 38.57

| Condition | Ex. 1 | Ex. 2 | Ex. 3 |
|---|---|---|---|
| (1) | 0.07~0.63 | 0.07~0.63 | 0.80 |
| (2) | 0.4~0.6 | 0.4~0.6 | 0.3~0.8 |
| (4) | 44.0 | 44.0 | 32.6 |
| (3) | 0.16~0.25 | 0.16~0.25 | 0.08~0.19 |

Figure 4:
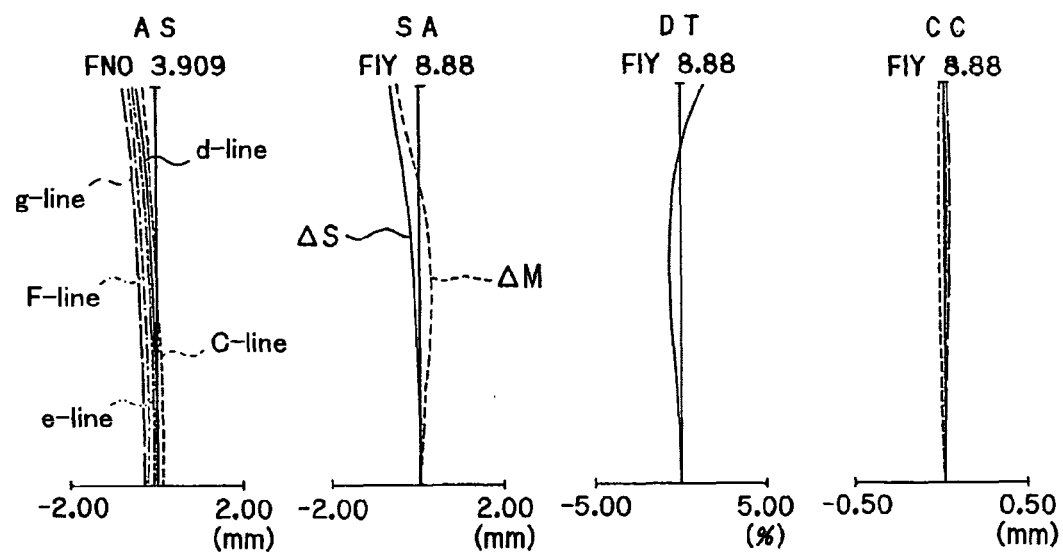
FIG. 4 is an aberration diagram for the viewfinder of Example 1.
Figure 4:
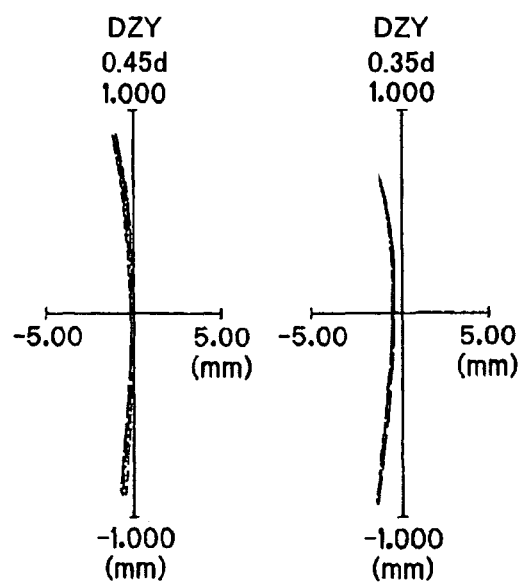
Figure 5:
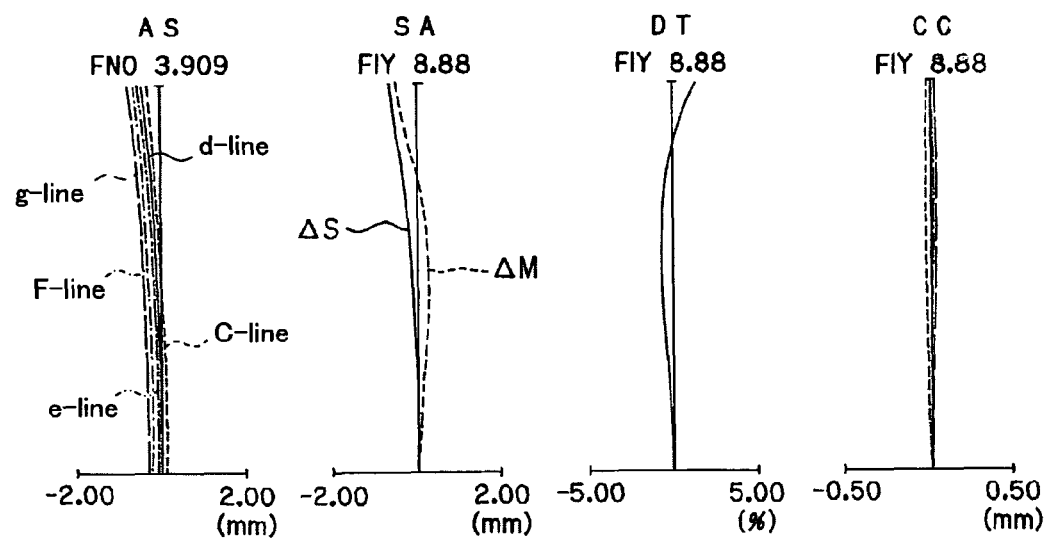
FIG. 5 is an aberration diagram for the viewfinder of Example 2.
Figure 5:
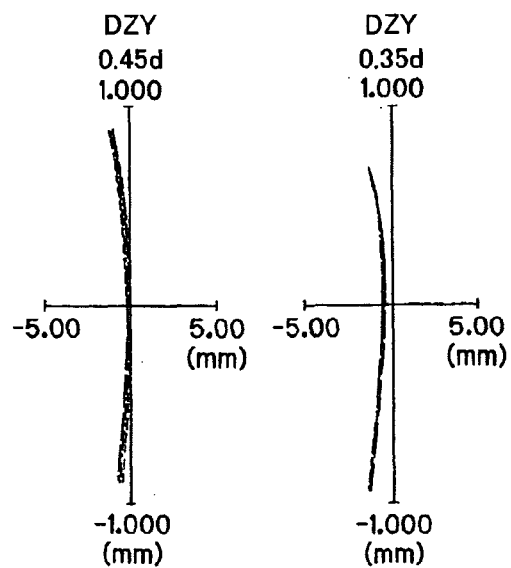
Figure 6:
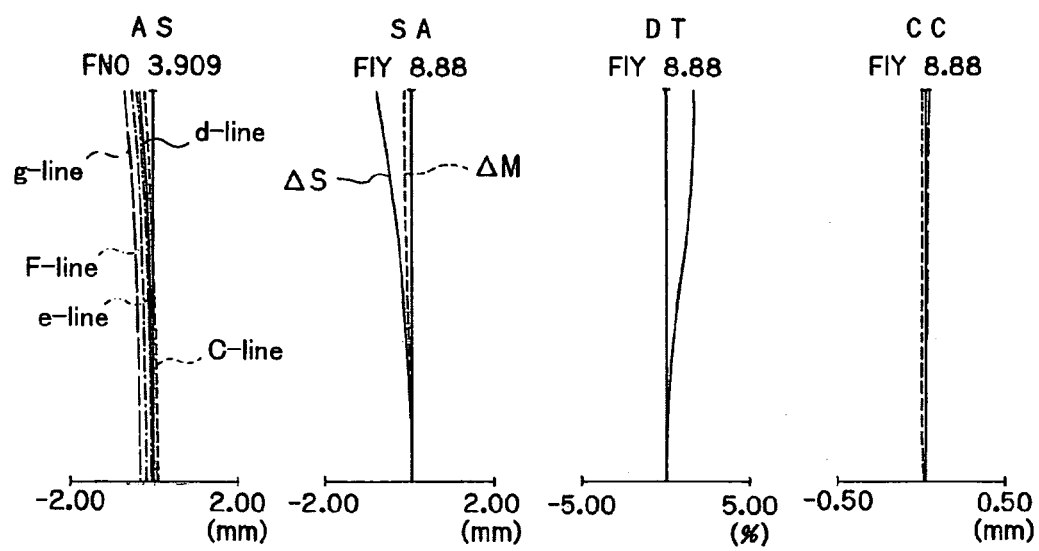
FIG. 6 is an aberration diagram for the viewfinder of Example 3.
Figure 6:
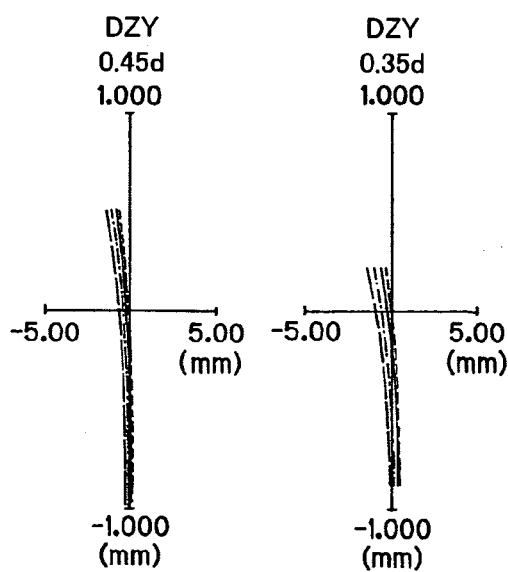

Aberration diagrams for Examples 1, 2 and 3 are presented in FIGS. 4, 5 and 6, respectively, wherein SA, AS, DT, DZY, FNO and FIY are indicative of spherical aberrations, astigmatism, distortion, coma, an F-number and an image height, respectively.

Figure 7:
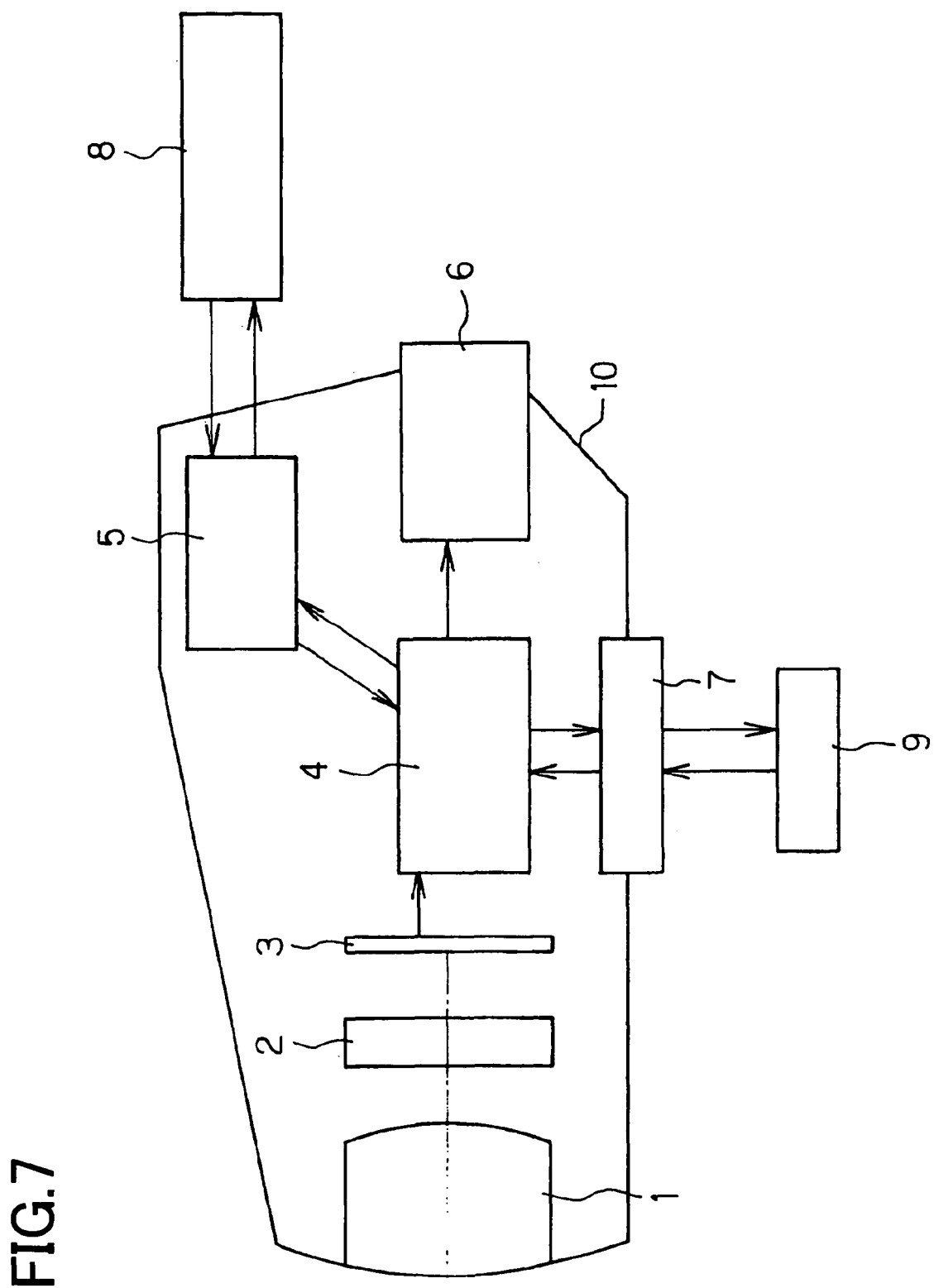
FIG. 7 is illustrative in construction of a digital camera that is one exemplar of the inventive imaging apparatus.

FIG. 7 is illustrative of the arrangement of a digital camera that is one exemplar of the inventive imaging apparatus. In FIG. 7, reference numeral 10 is a digital camera that is an imaging apparatus comprising an imaging optical system 1, a filter 2, an imaging device 3, a controller 4, a built-in memory 5, an electronic viewfinder 6 and an interface 7.

In the above imaging apparatus, the imaging optical system 1 is built up of a plurality of optical elements (such as lenses). Light coming out of an object is collected by this imaging optical system 1, and an object image is formed at this light collection position. And at this light collection position the imaging device 3 (light receiving plane) such as a CCD is located. The imaging device 3 is made up of an array of regularly arranged photoelectric elements. To prevent the moiré phenomenon, the filer 2 having a low-pass effect is located between the imaging optical system 1 and the imaging device 3. There may also be an infrared cut filter provided to cut off infrared light.

A light beam incident onto the imaging device 3 is converted by the photoelectric elements into electric (image) signals. The electric signals are entered in the controller 4 where signal processing such as gamma correction and image compression is applied to the electric signals. The electric signals to which signal processing has been applied are sent out to a personal computer 9 or the like via the built-in memory 5 and interface 7.

The electronic viewfinder 6 is made up of an illumination system, an image display device (not shown in FIG. 7), an eyepiece optical system (eyepiece lens), and so on. The inventive optical system O is used for the eyepiece optical system here, and an image display device is located on the viewing plane D. This image display device is controlled by the controller 4. The electronic viewfinder 6 of such arrangement enables the viewer to view an image taken, or being taken, of an object. Image data may be forwarded from the built-in memory 5 to an auxiliary memory 8. On the other hand, the same image data may also be forwarded from the interface 7 to the personal computer 9.

Figure 8:
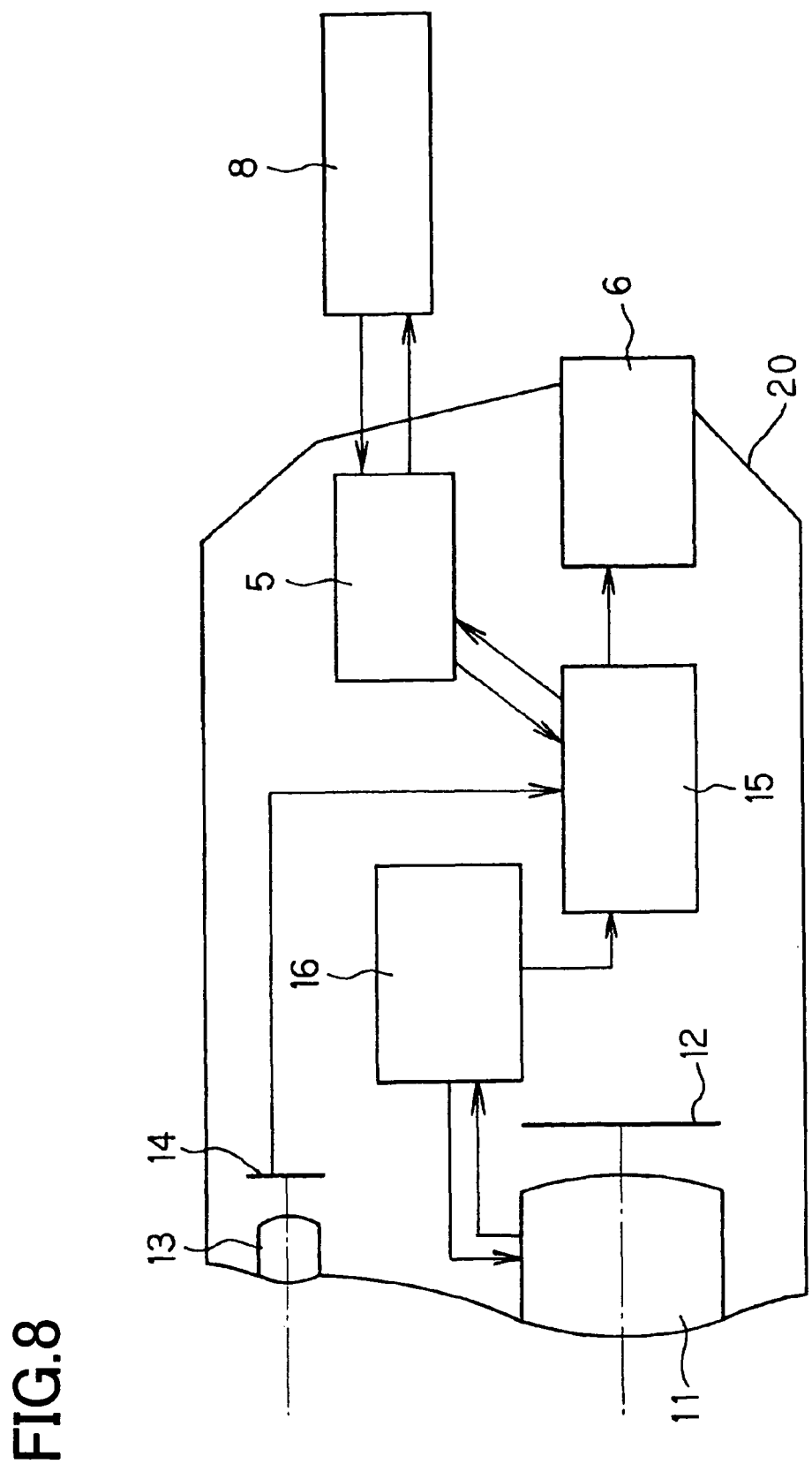
FIG. 8 is illustrative in construction of the inventive imaging apparatus applied to a silver-halide camera.

FIG. 8 is illustrative of the arrangement of a silver-halide camera to which the inventive imaging apparatus is applied. As shown in FIG. 8, a silver-halide camera 20 comprises an imaging optical system 11, a film 12, an objective lens 13, an imaging device 14 such as a CCD, a first controller 15, and a second controller 16. And there are a built-in memory 5 and an electronic viewfinder 5 provided as is the case with the digital camera of FIG. 7. Note here that the imaging optical system 11 and the objective lens 13 are different optical systems, as shown.

With the silver-halide camera 20 shown in FIG. 8, a light beam coming out of an object is collected by the imaging optical system 11, and an object image is formed on this light collection position (first light collection position). The film 12 is located at the first light collection position. The light beam coming out of the object is also collected by the objective lens 13, and an object image is formed at this light collection position (second light collection position). The imaging device 14 such as a CCD is located at the second light collection position. The imaging device 14 is made up of an array of regularly arranged photoelectric elements.

A light beam incident onto the imaging device 14 is converted by the photoelectric elements into electric signals (image signals). The electric signals are then entered in the first controller 15 where signal processing such as gamma correction and image compression is applied to them. The electric signals to which signal processing has been applied are sent out to the image display device. As described above, the electronic viewfinder 6 is constructed of an illumination system, an image display device, an eyepiece optical system (eyepiece lens), and so on. The inventive viewing optical system O is used for the eyepiece optical system here. Via the electronic viewfinder 6, the viewer can view an object being taken of an object.

On the other hand, the user (viewer) can view the taken images, using information or the like stored in the built-in memory 5. Such control is implemented by the first controller 15.

For the purpose of controlling the imaging optical system 11, there is the second controller 16 provided. The second controller 16 lets the imaging optical system 11 implement operations such as zooming and focusing. Information for zooming, focusing or the like is recognized by the first controller 15 based on signals from the second controller 16. By virtue of this recognition, the first controller 15 can work and adjust the image to be displayed on the image display device in conformity with the taking angle of view (zooming). On the basis of information for focusing or the like, the range of the images displayed on the display device may be corrected (parallax correction). Signals from the first controller 15 may also be sent out to the built-in memory 5 or an interface (not shown). Then, these signals (information) may be produced out to a personal computer or the like via the interface.

An optical path-splitting device may be located between the imaging optical system 11 and the film 12. A light beam out of the object may be guided to the imaging device 14 via that optical path-splitting device to form an object image on the imaging device 14. And viewing may be implemented on the basis of this object image. In this case, it is not necessary to use the objective lens 13.

What we claim is:

1. A view finder for guiding an image displayed on an image display device into the eye of a viewer, comprising:
    said image display device; and
    a viewing optical system positioned between said image display device and an eye point
    wherein said image display device is adapted to display said image,
    wherein said viewing optical system comprises, in order from said image display device toward said eye point, a front group including a first lens, and a filter,
    wherein said filter is located on a side of said front group opposite to a side thereof having said image display device located,
    wherein said viewing optical system comprises at least three lens elements, said filter includes an incident plane and an exit plane lined up and located substantially vertically with respect to the optical axis of said viewing optical system,
    wherein a lens system between said image display device and said filter in said viewing optical system is defined by said front group, said front group includes at most a total of two lens components, a lens system between said filter and said eye point in said viewing optical system is defined by a rear group, said rear group consists of a lens group having positive refracting power, and said lens group having positive refracting power includes at most a total of two lens components,
    wherein said image display device has a viewing plane, with satisfaction of the following condition (2):

$$0 < d/Y < 1 \tag{2}$$

where d is a distance between said viewing plane and said first lens, and Y is a position on said viewing plane where a farthest off-axis ray passes.

2. The view finder according to claim 1, characterized in that a chief ray incident onto said filter is substantially parallel with an optical axis.

3. An imaging apparatus, characterized by comprising an imaging device,
    a controller adapted to convert image information obtained from said imaging device into signals displayable on said image display device, and
    said viewfinder according to claim 1.

4. The view finder according to claim 1, further comprising:
    a rear group located between said filter and said eye point.

5. The view finder according to claim 4, wherein said rear group at least includes a lens group having positive refracting power.

6. The view finder according to claim 1, wherein said filter comprises a polarizing plate.

7. The view finder according to claim 1, wherein said first lens has an aspheric surface.

8. The view finder according to claim 1, wherein said front group has positive refracting power.

9. The view finder according to claim 8, wherein said image display device has the viewing plane, with satisfaction of the following condition (3):

$$0.01 < \tan\theta/d < 0.5 \tag{3}$$

where d is a distance between said viewing plane and said first lens, and θ is a maximum angle of field.

10. The view finder according to claim 8, which satisfies the following condition:

$$30 < \tan^{-1}(Y2/f) < 47 \tag{4}$$

where Y2 is a diagonal length of said image display device, and f is a focal length of the whole viewing optical system.

11. A view finder for guiding an image displayed on an image display device into the eye of a viewer, comprising:
    said image display device; and
    a viewing optical system positioned between said image display device and an eye point,
    wherein said image display device is adapted to display said image,
    wherein said viewing optical system comprises, in order from said image display device toward said eye point, a front group including a first lens, and a filter,
    wherein said filter is located on a side of said front group opposite to a side thereof having said image display device located,
    wherein said viewing optical system comprises at least three lens elements,
    said filter includes an incident plane and an exit plane lined up and located substantially vertically with respect to the optical axis of said viewing optical system,
    wherein a lens system between said image display device and said filter in said viewing optical system is defined by said front group,
    said front group includes at most a total of two lens components,
    a lens system between said filter and said eye point in said viewing optical system is defined by a rear group,
    said rear group consists of a lens group having positive refracting power,
    said lens group having positive refracting power includes at most a total of two lens components,
    wherein said front group has positive refracting power,
    wherein said image display device has a viewing plane, with satisfaction of the following condition (3):

$$0.01 < \tan\theta/d < 0.5 \tag{3}$$

where d is a distance between said viewing plane and said first lens, and θ is a maximum angle of field.

12. A view finder for guiding an image displayed on an image display device into the eye of a viewer, comprising:
    said image display device; and
    a viewing optical system positioned between said image display device and an eye point,
    wherein said image display device is adapted to display said image,
    wherein said viewing optical system comprises, in order from said image display device toward said eye point, a front group including a first lens, and a filter, wherein said filter is located on a side of said front group opposite to a side thereof having said image display device located, wherein said viewing optical system comprises at least three lens elements, said filter includes an incident plane and an exit plane lined up and located substantially vertically with respect to the optical axis of said viewing optical system, wherein a lens system between said image display device and said filter in said viewing optical system is defined by said front group, said front group includes at most a total of two lens components, a lens system between said filter and said eye point in said viewing optical system is defined by a rear group, said rear group consists of a lens group having positive refracting power, said lens group having positive refracting power includes at most a total of two lens components, wherein said front group has positive refracting power, wherein the view finder satisfies the following condition (4):

$$30 < \tan^{-1}(Y2/f) < 47 \qquad (4)$$

where Y2 is a diagonal length of said image display device, and f is a focal length of the whole viewing optical system.

* * * * *